United States Patent [19]

Sylvester

[11] 4,149,734
[45] Apr. 17, 1979

[54] DETACHABLE SADDLE TANKS FOR AGRICULTURAL VEHICLES AND THE LIKE

[76] Inventor: Merton E. Sylvester, Rte. 3, Sabetha, Kans. 66534

[21] Appl. No.: 888,767

[22] Filed: Mar. 21, 1978

[51] Int. Cl.² ............................................. B60P 3/22
[52] U.S. Cl. .................................................. 280/5 H
[58] Field of Search ..................... 280/5 H, 5 A, 5 R; 239/172, 149

[56] References Cited

U.S. PATENT DOCUMENTS

| | | | |
|---|---|---|---|
| 2,424,468 | 7/1947 | Keathley | 239/172 |
| 2,743,934 | 5/1956 | Chambers | 280/5 H |
| 2,797,957 | 7/1957 | North | 296/37 |
| 2,985,351 | 5/1961 | DuShane | 296/37 X |
| 3,003,775 | 10/1961 | Ackley | 280/5 R |
| 3,232,667 | 2/1966 | Schweitzer | 298/21 R |
| 3,311,183 | 3/1967 | Phillips | 280/5 H |
| 3,462,123 | 8/1969 | Oliver | 254/45 |
| 3,464,717 | 9/1969 | Davis | 280/164 |
| 3,488,061 | 1/1970 | Hansen | 280/5 H |
| 3,567,271 | 3/1971 | Gostomski | 280/23 MC |
| 3,857,576 | 12/1974 | Wilt | 280/5 A |
| 3,900,201 | 8/1975 | Johnson | 280/5 H |

FOREIGN PATENT DOCUMENTS 1504697   3/1978   United Kingdom .................... 280/5 R

*Primary Examiner*—John A. Pekar
*Attorney, Agent, or Firm*—Fishburn, Gold & Litman

[57] ABSTRACT

A detachable saddle tank arrangement for agricultural vehicles comprises a brace member shaped for detachable connection with the front frame or chasis portion of the tractor, and a pair of arm members having a forward end thereof pivotally attached to opposite ends of the brace member. The arm members are shaped for removably fastening the same to side portions of the tractor frame, and have liquid storage tanks mounted on the free ends thereof. A stand mechanism bodily supports the tank assembly at a height substantially coextensive with the tractor frame, whereby the tanks may be individually pivoted between a fanned apart, storage position, and a retracted or folded operational position to facilitate one man attachment and detachment of the tanks with the tractor.

10 Claims, 6 Drawing Figures

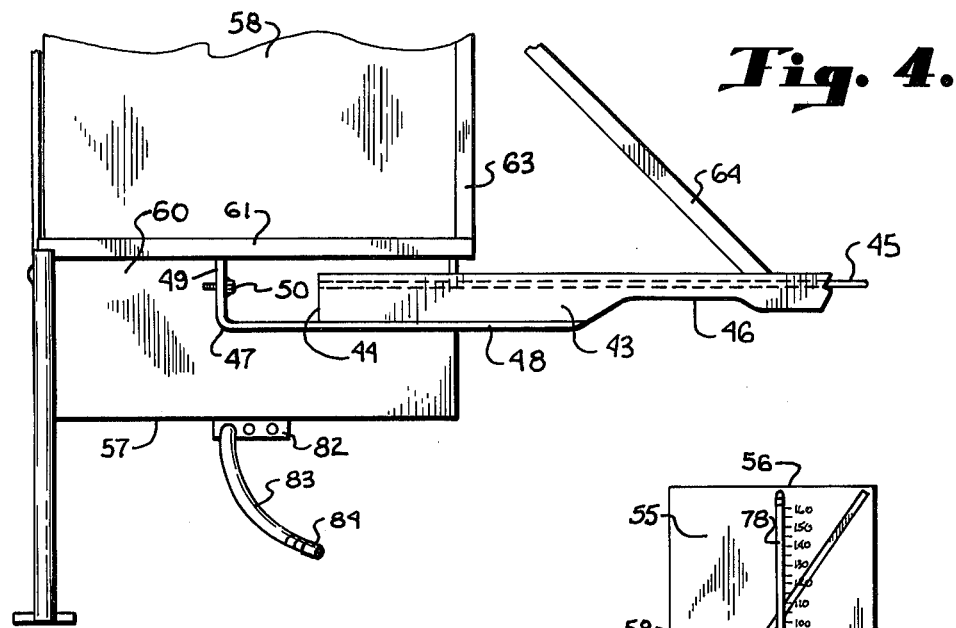
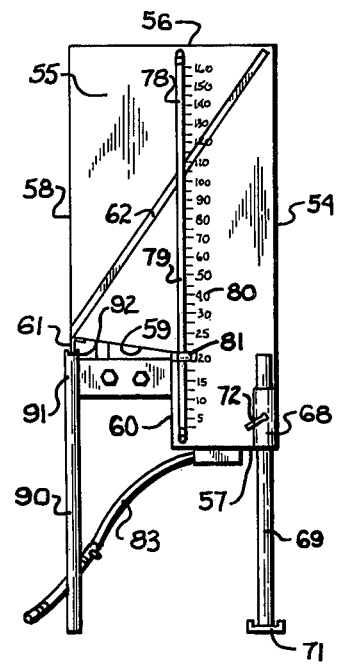
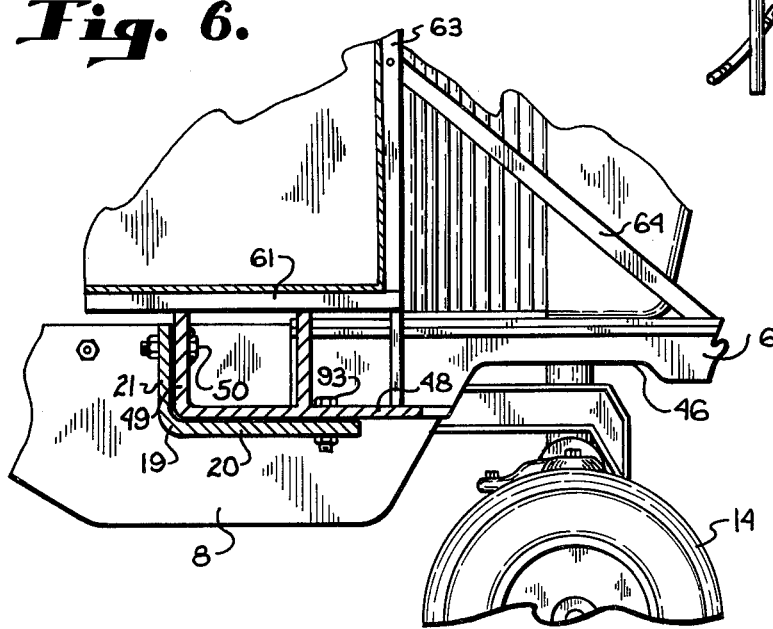

DETACHABLE SADDLE TANKS FOR AGRICULTURAL VEHICLES AND THE LIKE

BACKGROUND OF THE INVENTION

This invention relates to accessory tanks for agricultural equipment, and in particular to easily attachable and detachable saddle tanks for agricultural vehicles.

Agricultural vehicles, such as tractors, and the like are provided with auxiliary liquid storage tanks mounted on the sides of the tractor for transporting fertilizer, pesticides, herbicides, gasoline, water, and a vast variety of other fluids substances used in agriculture. These accessory side tanks are generally termed saddle tanks, and provide additional fluid carrying capacity for the tractor without the draw backs associated with a trailer drawn tank. In general, farmers require large fluid carrying capacity on their tractors only on very few occasions during the growing season, such as for spraying insecticid. However, when such liquid transportation is required, it is essential that the storage device be capable of retaining a large quantity of liquid, so as to reduce the number of trips from the field to the source of insecticide, and thereby increase time and fuel efficiency. Throughout the majority of the growing season, these large fluid storage tanks are generally not necessary to the tending of the farm, and it is therefore preferable that the tanks be removed from the tractor so as to reduce the tractor weight, improve the maneuverability of the tractor, and to access other areas of the tractor for attaching different accessories thereto. As previously noted, the saddle tanks are preferably quite large so as to provide maximum liquid storage capacity, and are consequently quite heavy and cumbersome to manipulate. Heretofore, the attachment of saddle tanks to the tractor has required at least two persons, and has required a considerable amount of time and effort.

SUMMARY OF THE INVENTION

The principal objects of the present invention are: to provide a detachable saddle tank arrangement for agricultural vehicles which can be attached thereto by a single person; to provide such an arrangement having a stand mechanism for bodily supporting the tanks above the ground for storage; to provide such an arrangement wherein the stand mechanism includes vertically adjustable legs for supporting the tanks at a height substantially coextensive with the frame portion of the tractor for quick and easy attachment; to provide such an arrangement wherein the tanks may be attached and detached on substantially any terrain; to provide such an arrangement wherein the tanks are mounted on pivotal arms and are rotated into place on the tractor with reduced effort; to provide such an arrangement wherein the tanks have a large storage capacity, yet do not obstruct the ground clearance of the tractor; to provide such an arrangement which is quickly, easily, yet securely attached to the tractor; to provide such an arrangement wherein during tank operation, the tanks are positioned between front and rear wheels of the tractor for improved tractor maneuverability; to provide such an arrangement wherein each of said tanks include a handle to facilitate rotating the same into an interconnected relation with the tractor; and to provide such an arrangement which is economical to manufacture, efficient in use, capable of a long operating life, and particularly well adapted for the proposed use.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 4 is an enlarged, fragmentary, elevational view of a saddle tank, particularly showing a supportive arm member thereof.

FIG. 5 is an end elevational view of the saddle tank, particularly showing a level indicator member thereof.

FIG. 6 is an enlarged, fragmentary, vertical cross-sectional view of the tank attached to the tractor, particularly showing an interconnecting bracket portion thereof.

DESCRIPTION OF PREFERRED EMBODIMENTS

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
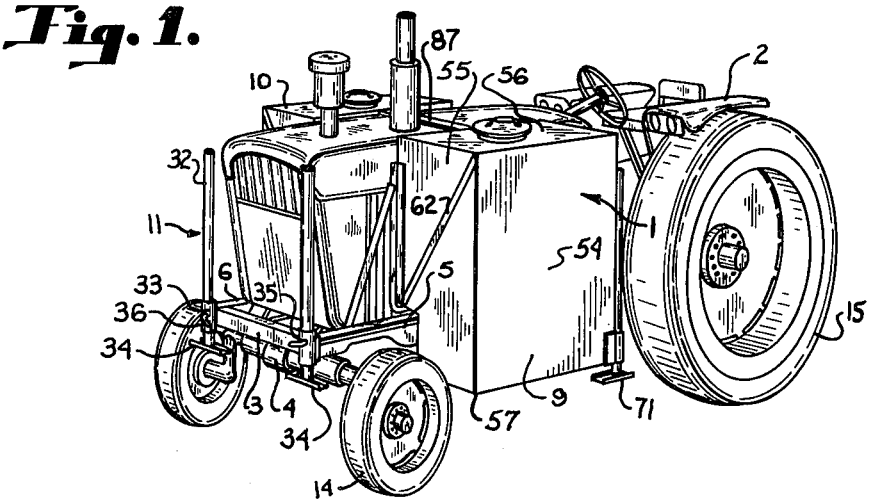
FIG. 1 is a perspective view of a saddle tank arrangement embodying the present invention, shown attached to an agricultural tractor.

For purposes of description herein, the terms "upper", "lower", "right", "left", "rear", "front", "vertical", "horizontal", and derivitives thereof shall relate to the invention as oriented in FIG. 1, however, it is to be understood that the invention may assume various alternative orientations, except where expressly specified to the contrary.

The reference numeral 1 generally designates a detachable saddle tank arrangement embodying the present invention, which is adapted for connection an agricultural vehicle, such as the illustrated tractor 2. The saddle tank arrangement 1 comprises a brace member 3 shaped for detachable connection with a front frame or chasis portion 4 of the tractor 2, and a pair of arm members 5 and 6 having a forward end thereof pivotally attached to the opposing ends of the brace member 3. The arm members 5 and 6 are shaped for removably fastening the same to side frame portions 7 and 8 of the tractor, and have liquid storage tanks 9 and 10 mounted on the free ends thereof. A stand mechanism 11 bodily supports the tank assembly at a height substantially coextensive with the tractor frame, whereby the tanks 9 and 10 may be individually pivoted between a fanned apart storage position (FIG. 3) to a retracted, or folded operational position (FIG. 2) to facilitate one man attachment and detachment of the tanks 9 and 10 to the tractor 2.

The illustrated tractor 2 is of conventional construction, and includes front and rear ground engaging wheels 14 and 15 respectively. For purposes of description herein, left and right shall be related to an operator positioned in the drivers seat or area 16 of the tractor and looking forwardly. The front frame portion 4 of the tractor 2 extends laterally across the forward end of the tractor, and is rigidly interconnected at each end thereof to the side frame portions 7 and 8 which extend rearwardly in a substantially parallel manner therefrom. The frame portions 4, 7 and 8 of the tractor are structural support members of the tractor, and are therefore quite strong and rigid. In the illustrated structure, the front frame portion 4 includes a forwardly extending bumper or bracket 17, having a flat, substantially coplanar top surface 18 which is adapted for abuttingly supporting the braces member 3 thereon. As best illustrated in FIG. 6, each of the illustrated side frames 7 and 8 includes an L-shaped bracket 9 having the inside edge thereof rigidly attached to the associated side frame by means such as welding, and extends substantially horizontally thereof. The bracket 19 includes a lower plate 20 and a rear plate 21, each of which has a pair of transversely spaced apertures therethrough for fastening the associated arm member to the tractor.

The brace member 3 includes first and second ends 25 and 26 and is shaped for detachable connection with the front frame portion 4 of the tractor 2. In this example, the brace member 3 has an L-shaped vertical cross-section, with a horizontally disposed upper flange 27, and a vertically oriented, depending lower flange 28. A C-shaped channel section 29 is fixedly attached to each end 25 and 26 of the brace with the open side oriented outwardly. Each of the channel brackets 29 is provided with a vertically disposed aperture and pin arrangement 30 which is adapted for pivotally connecting the arm members 5 and 6 thereto.

A pair of legs 32 are attached to the forward surface of the brace member 3, and in this example are telescopically adjustably mounted in mating sleeve members 33. The lower ends of the legs 32 include an enlarged foot portion 34 to alleviate settling and tipping of the tanks during the storage position, and a set screw arrangement 35 with outwardly extending handle member 36 is threadably mounted in each of these sleeves 33 and selectively locks the sleeve 33 and associated leg 32 in place.

Each of the arm members 5 and 6 includes a free, first end 40, and a second end 41 pivotally attached to the opposing brace ends 25 and 26. Because the left and right hand portions of the saddle tanks arrangement 1 are substantially identical, the description herein shall be directed to a single arm member and tank assembly. The forward end 41 of the arm members includes a vertically oriented sleeve or knuckle 42 which is positioned interjacent the opposing flanges of the channel bracket 29 and is pivotally mounted therebetween by a hinge pin (not shown). The arm members have a substantially T-shaped vertical cross-sectional shape, and include a flat, vertically oriented plate 43 (FIG. 4) having the forward end thereof fixedly attached to the sleeve 42, and extending rearwardly therefrom to a rear edge 44. A side flange 45 is fastened longitudinally along the plate 43 at a medial portion of the exterior surface, and extends substantially horizontally therefrom. The side plate 43 includes an elongate aperture or notch 46 which provides clearance for the front tractor tires 14. An L-shaped member 47 includes a lower plate 48 which is attached to the lower edge of the side plate 43, protrudes outwardly thereof, and extends from the rearward edge of the notch 46 to an upstanding flange portion 49 of the L-member 47. The upper flange 49 is provided with a pair of threaded fasteners or studs 50 fixedly attached to the flange and extending rearwardly therefrom to facilitate attaching the arm members 5 and 6 to the associated side frame portion 7 and 8.

Figure 3:
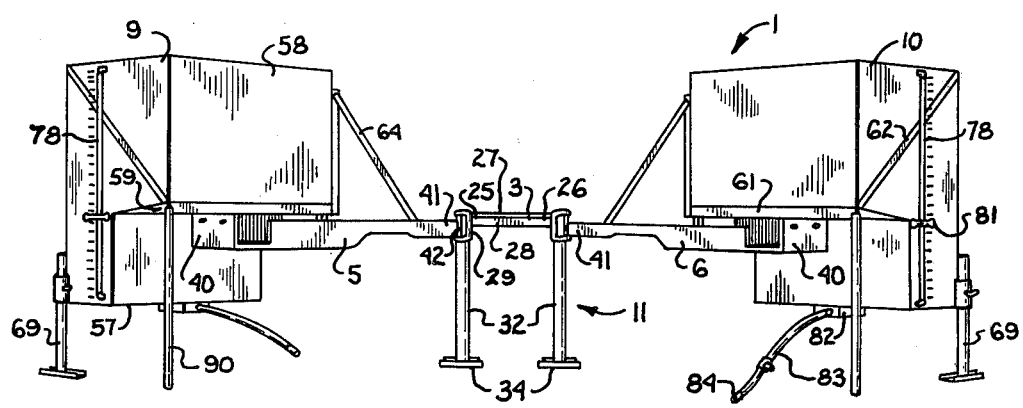
FIG. 3 is an elevational view of the saddle tank arrangement, shown in a fanned apart postion for tank storage.

The fluid storage tanks 9 and 10 are connected with and supported by the arm members 5 and 6 respectively, and are positioned adjacent the free end thereof. The illustrated tanks include side panels 54 opposing end of panels 55, top and bottom panels 56 and 57 respectively, and a rear panel 58. As best illustrated in FIGS. 3 and 5, each of the tanks includes an offset portion of the inward side thereof which is formed by a pair of substantially perpendicularly disposed panels 59 and 60. The L-shaped member 47 extends within and along the tank offset, and the upper flange member 49 thereof is rigidly attached to the panel member 59 at a medial portion thereof. The outer side edge of the flange 49 is disposed adjacent to the panel 60, and the inward edge of the flange 49, as well as the inward surface of the side plate 43 projects slightly outwardly of the tank rear panel 58. An L-shaped angle member 61 (FIG. 5) is attached to the tank panel 59 at the inward edge thereof to provide additional rigidity and support. Also, a brace 62 extends from the upper, outer corner of the tank, diagonally thereacross to the angle member 61 at both end panels 55 of each of the tanks for structural support. The tanks 9 and 10 are preferably provided with internal bracing or baffles (not shown) for improved rigidity and strength. As best illustrated in FIG. 6, a vertical, L-shaped support 63 is attached to the inward side of forward end panel 55, and includes an angle brace 64 having one end connected therewith, and the other end attached to the arm member 6 at a point slightly forward of the wheel notch 46.

A cylindrical sleeve member 68 is attached to the rear end panel 55 at the lower edge thereof, and is adapted to receive an adjustable leg 69 therein. The leg 69 is telescopically mounted within the sleeve 68, and includes an enlarged foot portion 71. A set screw arrangement 72 selectively locks the leg 69 and the sleeve 68 at a preselected vertical height.

Each of the tanks 9 and 10 includes a filling aperture and mating closure 76 in the top panel 56 thereof to facilitate filling the tanks with a selected fluid, such as insecticide or the like. Handles 77 are provided on the closures 76 to facilitate manipulating the same. A level indicator 78 is attached to the rearward end panel 55 of each of the tanks for visual observation of the fluid level of the tanks from the driving area 16 of the tractor. In this example, the level indicators 78 include a transparent hose 79 having opposing ends thereof attached to the upper and lowermost portions of the end panel 55 and communicating with the tank. Regularly spaced indicia 80 is applied to the tank end panel 55, and may be marked in volume measures, such as gallons, liters, or the like to correspond with the amount of liquid remaining in the tank. As fluid is introduced into the tank, the same rises both in the tank and the transparent hose 79 and each assumes under gravitational forces, and equalibrium level, whereby the operator of the tractor may ascertain the fluid level in each of the tanks. A handle member 81 is also attached to the rearward end panel 55 of each of the tanks, and facilitate rotation of the tanks for attaching and detaching the same from the tractor.

A sump member 82 extends downwardly of the tank bottom panel 57, and includes a flexible discharge hose 83 with a fitting 84 mounted at the free end thereof for supplying the liquid in the tanks to an associated agricultural implement, such as an insecticide sprayer, fertilizer dispenser, or the like (not shown).

Figure 2:
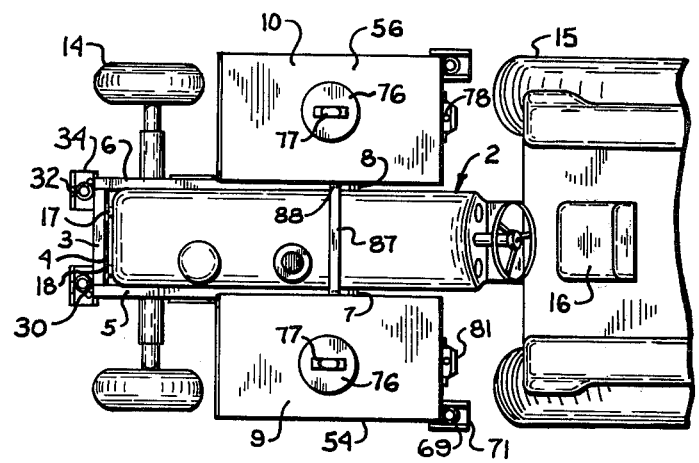
FIG. 2 is a top plan view of the saddle tank arrangement, shown attached to the tractor.

As best illustrated in FIGS. 1 and 2, this embodiment of the saddle tank arrangement a support brace 87 which interconnects the upper portions of the tanks. The brace 87 is in the form of a rigid strap which extends laterally between the tanks 9 and 10, and has opposing ends thereof detachably connected with mating brackets (not shown) attached to the tanks at the upper panels 56. The brace 87 is positioned at a longitudinal center area of the tanks, and is connected with the tanks by suitable fasteners, such as bolts 88.

The stand mechanism 11 includes a pair of elongate stand members 90 (FIG. 3) which support the free ends of the arm members 5 and 6 during tank storage and support the inward side of the tanks. As shown in FIG. 5, the upper end 91 of each of the stand members 90 preferably includes a slotted portion 92 which is shaped to receive the lower flange of the angle member 61 therein for secure support of the tanks.

In use, the saddle tank arrangement 1 may be easily and quickly attached and detached from the tractor 2. Assuming the saddle tank arrangement is initially in the fanned apart, storage position illustrated in FIG. 3, the saddle tank are attached to the tractor 2 in the following manner. The operator of the tractor drives the tractor to the location of the tanks, and guides the tractor forwardly between the arm members 5 and 6, and the tank members 9 and 10 toward the brace member 3. The tractor is manipulated such that the brace member 3 and front frame portion 4 of the tractor are disposed in a parallel relation. The operator then slowly advances the tractor forwardly, such that the bumper 17 is centered between the brace ends 25 and 26, glides under the upper flange 27 and abut the lower flange 28. The brace member 3 was previously set at a height substantially coextensive with the front frame portion of the tractor in a manner to be subsequently described therein. The operator then descends from the tractor, grasps the handle 81 of one of the tanks, and removes the stand member 90 from underneath the angle member 61. The tank is then lifted slightly by the operator and pivoted toward the tractor 2. As the pivoted tank approaches the tractor, the lower plate 48 of the L-shaped frame member 47 slides abuttingly upon the lower plate 20 of the bracket 19 and provides vertical support therefor. Because of the arrangement of the various legs 32 and 69, the brace member 3 need not be separately attached to the tractor by fasteners, but is simply abuttingly supported on the bumper 17. The rear flange 49 of the L-shaped frame member abuts and aligns with the rear plate 21 of bracket 19, and the studs 50 are directed through the mating apertures therein and nuts are attached to securely interconnect the arm with the tractor frame. Vertically disposed fasteners 93 connect the lower flanges 48 and 20. The remaining tank is, in a similar manner, pivoted about the brace member 3 and attached to the corresponding tractor bracket 19. Each of the adjustable legs 32 and 69 is then raised and locked in their uppermost position as shown in FIG. 1. The flexible hose fittings are connected to the appropriate portions of the agricultural implement, and the tanks are filled through filling apertures 76 with the appropriate liquid solution.

To store the tanks, the operator drives the tractor to the location at which he desires to store the tanks. The operator descends the tractor and positions himself at the front end of the unit to manipulate the stand mechanism 11. The set screw devices 35 are loosened, and the adjustable legs 32 descend under gravitational forces to a position wherein the feet 34 engage the ground. The operator then locks the legs in place. The fasteners 93 are loosened and removed, and the nuts on the studs 50 are unscrewed. The adjustable legs 69 are lowered and locked into place in the manner previously discussed in conjunction with the front legs 32. The flexible hoses 83 are separated from the implement. The tanks are then individually and sequentially pivoted to a fanned apart position away from the associated tractor side and set upon the ground. The stand members 90 are inserted between the ground and the angle brace 61 adjacent the outermost end of the arm to insure secure storage of the tanks.

It is to be understood that while I have illustrated and described certain forms of my invention, it is not to be limited to the specific forms or arrangement of parts herein described and shown.

What I desire and claim to secure by Letters Patent is:

1. A detachable saddle tank arrangement for agricultural tractors and the like, comprising:
   (a) a brace member having first and second ends, and being shaped for detachable connection with an end frame portion of a tractor;
   (b) first and second arm members each having a free, first end thereof, and a second end thereof pivotally attached to the first and second ends respectively of said brace member; said first and second arm members each being shaped for detachable connection with a side frame portion of said tractor; the first ends of said arm members having a fanned apart position for tank storage, and a folded position for tank operation;
   (c) fastening means detachably connecting the brace member and arm members with the tractor end and side frame portions respectively;
   (d) first and second tanks connected with and supported by said first and second arm members respectively, and disposed adjacent the first end of the associated arm; and
   (e) means supporting said brace member and arm members at a height substantially coextensive with the end and side frame portions of said tractor, whereby said tanks and said arm members are individually pivotable between said fanned apart position and said folded position for selectively connecting and disconnecting the tanks to said tractor.

2. An arrangement as set forth in claim 1 wherein said supporting means includes:
   (a) a pair of legs connected with and depending from said brace member, and being vertically adjustable to a raised position during tank operation.

3. An arrangement as set forth in claim 2 wherein said supporting means further includes:
   (a) a pair of sleeves attached to said brace member at the first and second ends thereof; said sleeves each having one of said legs telescopically mounted therein, and including a transversely extending set screw selectively locking the sleeve and leg in place.

4. An arrangement as set forth in claim 2 wherein said supporting means further includes:

(a) a pair of stand members supporting the first end of each of said arm members.

5. An arrangement as set forth in claim 2 wherein:
(a) said pair of legs constitutes a first pair of legs, and including
(b) a second pair of legs connected with and depending from an exterior portion of said tanks, and being vertically adjustable to a raised position during tank operation; and
(c) a pair of stand members having an upper end thereof detachably connected with and supporting an interior portion of said tanks, and being removed from said tanks during tank operation.

6. An arrangement as set forth in claim 1 wherein:
(a) said tanks each have a level indicator attached to a rear portion thereof for visual observation of tank level from a driving area of said tractor.

7. An arrangement as set forth in claim 1, including:
(a) a support brace extending laterally between said tanks, and having first and second ends thereof detachably fastened to said first and second tanks respectively at an upper portion thereof and interconnecting the same.

8. An arrangement as set forth in claim 1, including:
(a) a filling aperture positioned in a top portion of each of said tanks, and a closure therefor.

9. An arrangement as set forth in claim 1, including:
(a) a bracket plate having one portion adapted for rigid connection with the side frame portion and extending laterally and horizontally thereof; said bracket plate abuttingly supporting an associated one of said arm members during tank operation.

10. An arrangement as set forth in claim 1, wherein:
(a) said first end of each of said arm members is spaced from said brace member, whereby during tank operation, said first and second tanks are each positioned longitudinally intermediate front and rear wheels of said tractor.

* * * * *